(12) United States Patent
Wu et al.

(10) Patent No.: US 10,789,982 B2
(45) Date of Patent: Sep. 29, 2020

(54) METHOD, DEVICE AND SYSTEM FOR RECORDING INFORMATION, STORAGE MEDIUM AND PROCESSING UNIT

(71) Applicant: LIUZHOU GUITONG TECHNOLOGY CO., LTD., Guangxi (CN)

(72) Inventors: Jin Wu, Guangxi (CN); Zhenghai Kang, Guangxi (CN); Haitao Li, Guangxi (CN)

(73) Assignee: LIUZHOU GUITONG TECHNOLOGY CO., LTD., Guangxi (CN)

( * ) Notice: Subject to any disclaimer, the term of this patent is extended or adjusted under 35 U.S.C. 154(b) by 138 days.

(21) Appl. No.: 16/027,398

(22) Filed: Jul. 5, 2018

(65) Prior Publication Data

US 2019/0057718 A1  Feb. 21, 2019

(30) Foreign Application Priority Data

Aug. 16, 2017  (CN) .......................... 2017 1 0702451

(51) Int. Cl.
*G11B 20/10*  (2006.01)
*G10L 19/008*  (2013.01)
*G11B 27/32*  (2006.01)
*G11B 27/10*  (2006.01)

(52) U.S. Cl.
CPC ...... *G11B 20/10527* (2013.01); *G10L 19/008* (2013.01); *G11B 27/102* (2013.01); *G11B 27/32* (2013.01); *G11B 2020/10592* (2013.01)

(58) Field of Classification Search
CPC . G11B 20/10527; G11B 27/102; G11B 27/32; G10L 19/008
See application file for complete search history.

(56) References Cited

U.S. PATENT DOCUMENTS

| | | | | |
|---|---|---|---|---|
| 2010/0104255 | A1* | 4/2010 | Yun ........................ | H04N 5/765 386/207 |
| 2010/0289957 | A1* | 11/2010 | Hardacker .............. | G06F 3/147 348/552 |
| 2014/0192208 | A1* | 7/2014 | Okincha .............. | H04N 17/002 348/188 |
| 2015/0097495 | A1* | 4/2015 | Moore ................. | H05B 37/029 315/291 |

* cited by examiner

*Primary Examiner* — Mishawn N. Hunter
(74) *Attorney, Agent, or Firm* — Gang Yu

(57) ABSTRACT

The disclosure provides a method, device and system for recording information, a storage medium and a processing unit. The method for recording information includes that: non-Audio/Video (AV) information forming a preset association relationship with a first target file is acquired, wherein the first target file includes AV information; and the AV information and the non-AV information are synchronously recorded according to an information synchronization condition.

20 Claims, 3 Drawing Sheets

10: First interface

20: Processing unit

US 10,789,982 B2

METHOD, DEVICE AND SYSTEM FOR RECORDING INFORMATION, STORAGE MEDIUM AND PROCESSING UNIT

TECHNICAL FIELD

The embodiments of the disclosure relate to the field of information acquisition, and particularly to a method for recording information, device and system, a storage medium and a processing unit.

BACKGROUND

At present, in daily life and production control processes, force, thermal, sound, light, electrical information and the like are usually met. However, there is yet no solution of recording such information in a temporally synchronous manner, particularly synchronously recording fast transient information, at present, but it is necessary in some scenarios. For example, on an automatic welding production line, a controller sends a set of control instructions at a certain moment, and there is no equipment capable of directly synchronously recording these control instructions and results generated by them at the same time at present.

In a conventional art, there exists a solution of recording information through a video monitoring recorder, but it may simultaneously record video information generated by the recorder and sound information acquired by a pick-up only.

In the conventional art, there may also exist a solution of recording information through a digital oscilloscope and a logic analyzer, but it may simultaneously record a plurality of sets of electrical signals only, and these electrical signals take time as a variable, and have phase information, amplitude information, sampling periods and the like. The digital oscilloscope and the logic analyzer are not configured to record video information in a specific format.

In the conventional art, there may further exist a solution of recording information through a strip chart recorder and a circular chart recorder, but it may also simultaneously record a small number of electrical signals only, and these electrical signals also take time as a variable, and have phase information, amplitude information, sampling periods and the like.

Since there is no solution of synchronously recording non-audio and non-video stream information besides Audio/Video (AV) information in the conventional art, but it is necessary sometimes, there exists the technical problem of undiversified synchronously recorded information during AV information recording.

For the problem of undiversified synchronously recorded information during AV information recording in the conventional art, there is no effective solution at present.

SUMMARY

A main purpose of the disclosure is to provide an information recording method, device and system, a storage medium and a processing unit, so as to at least solve the problem of undiversified synchronously recorded information during audio and video information recording.

In order to achieve the purpose, according to an aspect of the disclosure, a method for recording information is provided, which may include that: non-AV information forming a preset association relationship with a first target file is acquired, wherein the first target file may include AV information; and the AV information and the non-AV information are synchronously recorded according to an information synchronization condition.

Optionally, before the operation that the AV information and the non-AV information are synchronously recorded according to the information synchronization condition, the method may further include that: synchronization information is acquired from a preset file or a preset synchronization information generator, wherein the synchronization information may be configured to synchronously record the AV information and the non-AV information; and the operation that the AV information and the non-AV information are synchronously recorded according to the information synchronization condition may include that: the AV information and the non-AV information are synchronously recorded under the information synchronization condition according to the synchronization information.

Optionally, the operation that the non-AV information forming the preset association relationship with the first target file is acquired may include that: a second target file forming the preset association relationship with the first target file is acquired; and the non-AV information is acquired from the second target file.

Optionally, before the operation that the AV information and the non-AV information are synchronously recorded, the method may further include that: synchronization information is acquired from the first target file or the second target file, or the synchronization information is extracted from AV information which is being recorded into the first target file, wherein the synchronization information may be configured to synchronously record the AV information and the non-AV information; and the operation that the AV information and the non-AV information are synchronously recorded may include that: the AV information and the non-AV information are synchronously recorded according to the synchronization information.

Optionally, the operation that the synchronization information is acquired from the second target file may include at least one of that: first time synchronization information is acquired from the second target file, and the first time synchronization information is determined as the synchronization information, wherein the first time synchronization information may be configured to indicate synchronous recording of each piece of information forming the preset association relationship into a corresponding target file and recording of a synchronization information scale when each piece of information forming the preset association relationship is extracted, wherein the synchronization information scale may be configured to mark the synchronization information; and first restoration speed information is acquired from the second target file, and the first restoration speed information is determined as the synchronization information, wherein the first restoration speed information may be configured to indicate a first restoration speed for synchronous restoration of the second target file.

Optionally, the operation that the synchronization information is extracted from the AV information which is being recorded into the first target file may include that: second time synchronization information is extracted from the AV information which is being recorded into the first target file, and the second time synchronization information is determined as the synchronization information, wherein the second time synchronization information may be configured to indicate a condition for restoring the information forming the preset association relationship in each target file.

Optionally, the operation that the non-AV information forming the preset association relationship with the first target file is acquired may include that: the non-AV information is extracted from the first target file.

Optionally, the operation that the non-AV information is extracted from the first target file may include that: the non-AV information is extracted from the first target file through a preset player, wherein the preset player may be configured to play the first target file.

Optionally, before the operation that the AV information and the non-AV information are synchronously recorded, the method may further include that: synchronization information provided by the preset player is acquired, wherein the synchronization information may be configured to synchronously record the AV information and the non-AV information when the target file is played; and the operation that the AV information and the non-AV information are synchronously recorded may include that: the AV information and the non-AV information are synchronously recorded according to the synchronization information.

Optionally, the operation that the AV information and the non-AV information are synchronously recorded according to the synchronization information may include that: at least one first information channel is created in the first target file, wherein the first target file may include a first preset information channel and a second preset information channel, the first preset information channel may be configured to represent a position of video information in the AV information in the first target file, and the second preset information channel may be configured to represent a position of audio information in the AV information in the first target file; and according to the synchronization information, the video information is synchronously recorded into the first preset information channel, the audio information is synchronously recorded into the second preset information channel, and the non-AV information extracted from the first target file is recorded into the at least one first information channel in the target file.

Optionally, the operation that the AV information and the non-AV information are synchronously recorded according to the synchronization information may include that: according to the synchronization information, video information of the first target file is synchronously recorded into first preset information channel, audio information of the first target file is synchronously recorded into a first sound track in preset double sound tracks, and the non-AV information extracted from the first target file is synchronously recorded into a second sound track in the preset double sound tracks, wherein the first preset information channel may be configured to represent a position of the video information in the AV information in the first target file, the first sound track may be configured to represent a position of the audio information in the AV information in the first target file, and the second sound track may be configured to represent a position of the non-AV information in the first target file.

Optionally, after the operation that the AV information and the non-AV information are synchronously recorded, the method may further include that: the synchronously recorded AV information and non-AV information are embedded into a third target file.

Optionally, after the operation that the AV information and the non-AV information are synchronously recorded, the method may further include that: the synchronously recorded AV information and non-AV information are embedded into a video code stream, wherein the AV information and the non-AV information may be additional information of the video code stream.

Optionally, the operation that the non-AV information forming the preset association relationship with the first target file is acquired may include that: under the circumstance that the non-AV information and the first target file correspond to one or a set of control instructions, it is determined that that non-AV information and the first target file form the preset association relationship, and the non-AV information is acquired; and/or under the circumstance that a file name of a file where the non-AV information is located is the same as a file name of the first target file, it is determined that the non-AV information and the first target file form the preset association relationship, and the non-AV information is acquired.

Optionally, the operation that the non-AV information forming the preset association relationship with the first target file is acquired may include that: the non-AV information forming the preset association relationship with the first target file is synchronously acquired from an information stream.

Optionally, the first target file may include: expressed AV information and default AV information, wherein the expressed AV information may be information set according to a preset instruction and required to be recorded synchronously with the non-AV information, and the default AV information may be default information required to be recorded synchronously with the non-AV information.

According to another aspect of the disclosure, a device for recording information is further provided, which may include: an acquisition unit, configured to acquire non-AV information forming a preset association relationship with a first target file, wherein the first target file may include AV information; and a recording unit, configured to synchronously record the AV information and the non-AV information according to an information synchronization condition.

In order to achieve the purpose, according to another aspect of the disclosure, a device for recording information is further provided, which may include: a first interface, configured to receive a signal and/or second target file bearing non-AV information forming a preset association relationship with a first target file including AV information, and send the signal to a processing unit; and the processing unit configured to synchronously record and/or synchronously restore the AV information and the non-AV information, connected with the first interface and configured to receive and/or send the signal.

In order to achieve the purpose, according to another aspect of the disclosure, a system for recording information is provided, which may include: a device for recording information of an embodiment of the disclosure; and an execution mechanism, connected with the device for recording information and configured to synchronously reproduce AV information and non-AV information.

In order to achieve the purpose, according to another aspect of the disclosure, a storage medium is further provided, which may include a stored program, wherein the program may be run to control equipment where the storage medium is located to execute the method for recording information of an embodiment of the disclosure.

In order to achieve the purpose, according to another aspect of the disclosure, a processing unit is further provided, which may be configured to run a program, wherein the program may be run to execute the method for recording information of the embodiment of the disclosure.

According to the disclosure, the non-AV information forming the preset association relationship with the first target file is acquired, wherein the first target file includes the AV information and/or stream information formed by the AV information; and the AV information and the non-AV information are synchronously recorded according to the information synchronization condition. Since non-audio and non-video stream information associated with an audio and video streaming media file is synchronously recorded according to the synchronization information, the problem of undiversified synchronously recorded information during AV information recording is solved, and a technical effect of enriching synchronously recorded information during AV information recording is further achieved.

BRIEF DESCRIPTION OF THE DRAWINGS

The drawings forming a part of the application are adopted to provide a further understanding to the disclosure, and schematic embodiments of the disclosure and descriptions thereof are adopted to explain the disclosure and not intended to form improper limits to the disclosure. In the drawings.

DETAILED DESCRIPTION OF THE EMBODIMENTS

It is important to note the embodiments in the application and characteristics in the embodiments may be combined without conflicts. The disclosure will be described below with reference to the drawings and in combination with the embodiments in detail.

In order to make the solutions of the application better understood by those skilled in the art, the technical solutions in the embodiments of the application will be clearly and completely described below in combination with the drawings in the embodiments of the application. Obviously, the described embodiments are not all embodiments but only part of embodiments of the application. All other embodiments obtained by those skilled in the art on the basis of the embodiments in the application without creative work shall fall within the scope of protection of the application.

It is important to note that terms "first", "second" and the like in the specification, claims and drawings of the application are adopted not to describe a specific sequence or order but to distinguish similar objects. It should be understood that data used like this may be exchanged under a proper circumstance for implementation of the embodiments of the application described here. In addition, terms "include" and "have" and any transformation thereof are intended to cover exclusive inclusions. For example, a process, method, system, product or equipment including a series of steps or units is not limited to those steps or units which are clearly listed, but may include other steps or units which are not clearly listed or intrinsic to the process, the method, the product or the equipment.

Embodiment 1

The embodiment of the disclosure provides a device for recording information.

Figure 1:
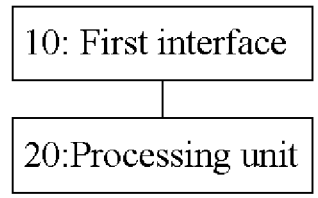
FIG. 1 is a schematic diagram of a device for recording information according to an embodiment of the disclosure.

FIG. 1 is a schematic diagram of a device for recording information according to an embodiment of the disclosure. As shown in FIG. 1, the device for recording information includes: a first interface 10 and a processing unit 20.

The first interface 10 is configured to receive a signal and/or second target file bearing non-AV information forming a preset association relationship with a first target file including AV information, and send the signal to the processing unit 20.

In the embodiment, the AV information is audio and video information, the non-AV information is non-audio and non-video information, the first interface 10 may be configured to receive the signal bearing the non-AV information, and the non-AV information forms the preset association relationship with the first target file, wherein the first target file includes the AV information, and may be audio and video streaming media and/or a file recording streaming media information. Optionally, when there exists the second target file synchronously associated with the first target file, for example, when different types of non-AV information is stored in different types of second target files and their synchronization information is stored in another independent target file, there may be multiple second target files at this moment, the first interface 10 is further configured to receive the second target file bearing the non-AV information forming the preset association relationship with the first target file, and the second target file may be a file configured to record non-audio and non-video information, wherein the preset association relationship is a synchronous association relationship, and may be established through files with the same file name but different suffixes. The first interface 10 sends the signal to the processing unit 20 after receiving the signal and/or the second target file.

It is important to note that an entry manner for acquiring the first target file is not limited in the embodiment, and any manner capable of acquiring the first target file including the AV information falls within the scope of protection of the application, and will not be described with an example one by one.

The processing unit 20 configured to synchronously record and/or synchronously restore the AV information and the non-AV information is connected with the first interface 10, and is configured to receive and/or send the signal and process the signal.

The processing unit 20 of the embodiment is connected with the first interface 10, may be an ASPU, and for example, is an intelligent mobile terminal platform such as a mobile phone, a software and hardware platform running a linux system and a software and hardware platform running a windows system, which will not be limited herein. The processing unit 20 is configured to synchronously record and/or synchronously restore the AV information and the non-AV information, and may be configured to receive the signal and/or send out the signal and process the signal.

Optionally, the non-AV information of the embodiment may include force, thermal, sound, light, electrical, character, symbol and digital information and the like, wherein the force information may be information generated by movement of a workpiece, movement of a welding gun, supply of a welding wire, mechanical deformation of a welding seam and the like, the thermal information may be information about a weldment temperature change caused by a welding current, a degree of influence on the workpiece and the like, the sound information may be information about a sound of a mechanical motion audible for ears, a sound of a temperature change, a mechanical wave, reflecting mechanical vibration, inaudible for the ears and the like, the light information may be information about light which may be directly visible for eyes, movement or another geometric change between objects, a light wave invisible for the eyes and the like, and the electrical information may be the generated welding current, response information of a process measurement and control instrument and apparatus and the like. There are no limits made herein.

Optionally, the device further includes: an audio interface, configured to transmit audio stream information; and a video interface, configured to transmit video stream information, wherein the processing unit is connected with the audio interface and the video interface.

The audio interface is configured to transmit the audio stream information in the AV information, and may be configured to receive a signal bearing the audio stream information; and the video interface is configured to transmit the video stream information in the AV information, and may be configured to receive a signal bearing the video stream information, and the processing unit is connected with the audio interface and the video interface.

Optionally, the audio interface includes: an audio input interface, configured to input first audio stream information to the processing unit; and an audio output interface, configured to output second audio stream information obtained by processing of the processing unit.

The audio interface of the embodiment includes the audio input interface and the video output interface, wherein the audio input interface is configured to input the first audio stream information to the processing unit, may be configured to receive a signal bearing the first audio stream information, and may include a transmitter, a microphone, a Microphone (MIC), a line level, line in, AUDIO IN and the like; and the audio output interface is configured to output the second audio stream information obtained by processing of the processing unit, may be configured to output a signal bearing the second audio stream information, and may include line out, a line level, an earphone, a monitor, a loudspeaker and the like. There are no limits made herein.

Optionally, the video interface includes: a video input interface, configured to input first video stream information to the processing unit; and a video output interface, configured to output second video stream information obtained by processing of the processing unit.

The video interface of the embodiment includes the video input interface and the video output interface, wherein the video input interface is configured to input the first video stream information to the processing unit, may be configured to input a signal bearing the first video stream information, and may include a composite video input interface of Programmable Array Logic (PAL), National Television Standards Committee (NTSC), Sequential Color and Memory (SECAM) and the like, a digital video camera input interface, a Universal Serial Bus (USB) video camera (camera) input interface, a web video camera (camera) input interface and the like; and the video output interface is configured to output the second video stream information obtained by processing of the processing unit, may be configured to output a signal bearing the second video stream information, and may be one or more of input interface which may be recognized by all video display equipment such as a television and a computer display and have existed at present and/or will emerge in the future, for example, an AV interface, a High-Definition Multimedia Interface (HDMI), a Digital Video Interface (DVI), a Video Graphics Array (VGA) interface, a USB interface and a Composite Video Broadcast Signal (CVBS) interface. There are no limits made herein.

Optionally, the device further includes: a serial interface, connected with the processing unit and configured to enable the processing unit to perform serial communication; and a parallel interface, connected with the processing unit and configured to enable the processing unit to perform parallel communication.

The device of the embodiment includes the serial interface and the parallel interface, wherein the serial interface may be an input and output interface configured for serial online communication, is configured to enable the processing unit to perform serial communication, and may be RS232, RS485, RS422, Inter-Integrated Circuit (IIC), a Serial Peripheral Interface (SPI), Controller Area Network (CAN) and a new serial interface emerging in the future; and the parallel interface may be an input and output interface for parallel online communication, is configured to enable the processing unit to perform parallel communication, and for example, is a parallel printing interface LP on a personal computer, or an existing or future parallel input and output interface for parallel online communication of an apparatus. There are no limits made herein.

Optionally, the device further includes: a digital quantity interface, connected with the processing unit and configured to transmit a digital quantity signal of a non-AV; and an analogue quantity interface, connected with the processing unit and configured to transmit an analogue quantity signal of the non-AV.

The device of the embodiment includes the digital quantity interface and the analogue quantity interface, wherein the digital quantity interface is a digital quantity input and output interface, may be configured to input and output a signal bearing a digital quantity, and may include an interface configured to receive state quantity signal input, an interface configured to output low-power state quantity signal output, an output interface configured to output a high-power switching driving signal and an output interface configured for a Pulse Width Modulation (PWM) signal with a driving capability; and the analogue quantity interface is an analogue quantity input and output interface, may be configured to input and output a signal bearing an analogue quantity, and may include a measurement input interface configured to accept an analogue quantity signal of which a size or strength may continuously change, an analogue quantity output interface configured to drive target equipment accepting the analogue quantity signal and a PWM analogue quantity output driving interface configured to output the analogue quantity in a PWM manner. There are no limits made herein.

Optionally, the device further includes: a network interface, connected with the processing unit and configured to enable the processing unit to connect network equipment; and a wireless interface, connected with the processing unit and configured to enable the processing unit to perform wireless communication.

The device of the embodiment further includes the network interface and the wireless interface, wherein the network interface may be a local area network interface, a wide area network interface, an Ethernet interface and an Internet interface; and the wireless interface may be a Bluetooth interface, a Wireless Fidelity (WI-FI) interface, a ZigBee interface, a General Packet Radio Service (GPRS) interface, a 2nd-Generation (2G) mobile network interface, a 3rd-Generation (3G) mobile network interface, a 4th-Generation (4G) mobile network interface, a 5th-Generation (5G) mobile network interface, a medium-wave communication interface, a short-wave communication interface, an ultra-short-wave communication interface, a microwave communication interface and the like. There are no limits made herein.

Optionally, the device further includes: a preset player configured to play the first target file, connected with the processing unit and configured to input the non-AV information and/or AV information to the processing unit.

The device further includes the preset player, and the preset player is a dedicated player, and is configured to play an audio and video streaming media file. Synchronous extraction of non-audio and non-video information from the audio and video streaming media file is completed by the preset player, and time synchronization information required by extraction of the non-audio and non-video information is also provided by the preset player. The preset player is further configured to input the non-AV information and/or the AV information to the processing unit.

Figure 2:
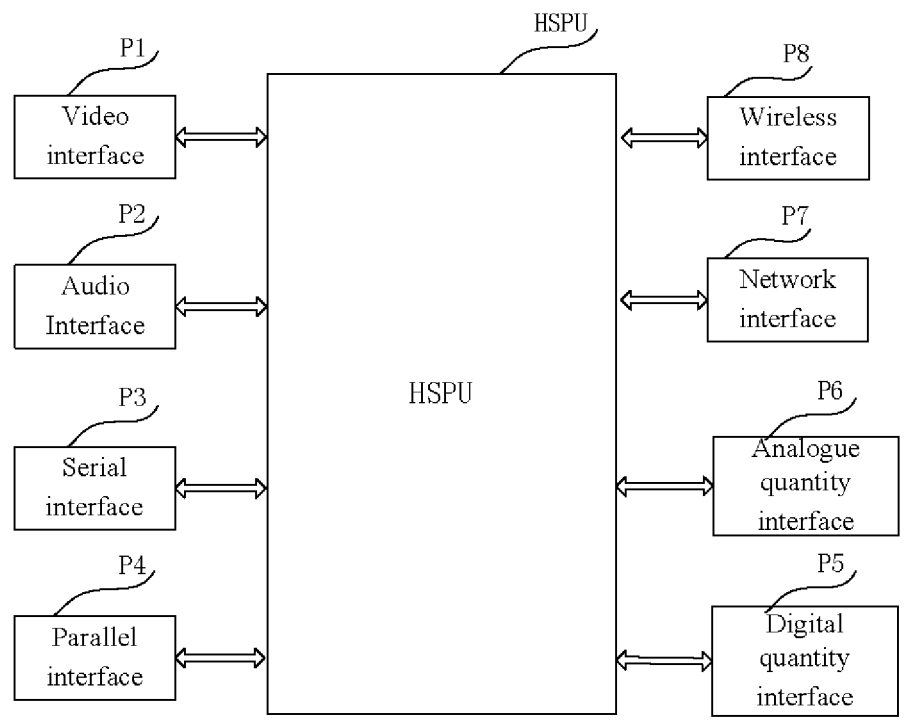
FIG. 2 is a structure block diagram of a holographic signal recorder according to an embodiment of the disclosure.

FIG. 2 is a structure block diagram of a holographic signal recorder according to an embodiment of the disclosure. As shown in FIG. 2, the holographic signal recorder includes: an ASPU, a video interface P1, an audio interface P2, a serial interface P3, a parallel interface P4, a wireless interface P8, a network interface P7, an analogue quantity interface P6 and a digital quantity interface P5.

The ASPU, for example, an intelligent terminal platform such as a mobile phone, a software and hardware platform running a linux system and a software and hardware platform running a windows system, may run a software and hardware platform of the homographic synchronization recorder of the embodiment.

The video interface P1 includes: a video input interface and an output interface, wherein the video input interface may include a composite video input interface of PAL, NTSC, SECAM and the like, a digital video camera (camera) input interface, a USB video camera (camera) input interface, a web video camera (camera) input interface and the like; and the video output interface includes one or more of input interfaces which may be recognized by all video display equipment such as a television and a computer display and have existed at present and/or will emerge in the future, for example, an AV interface, an HDMI, a DVI, a VGA interface, a USB interface and a CVBS interface.

The audio interface P2 includes: an audio input interface and an output interface, wherein the audio input interface may include a transmitter, a microphone, a MIC, a line level, line in, AUDIO IN and the like; and the audio output interface may include line out, a line level, an earphone, a monitor, a loudspeaker and the like.

The serial interface P3 is an input and output interface configured for serial online communication, for example, RS232, RS485, RS422, IIC, an SPI, CAN and a new serial bus interface emerging in the future.

The parallel interface P4 is an input and output interface for parallel online communication, for example, a parallel printing interface LP on a personal computer and a parallel input and output interface which has existed and/or will emerge in the future for parallel online communication of an apparatus.

The digital quantity interface P5 is a digital quantity input and output interface, and may include an interface configured to receive state quantity signal input, an interface configured to output low-power state quantity signal output, an output interface configured to output a high-power switching driving signal and an output interface configured for a PWM signal with a driving capability.

The analogue quantity interface P6 is an analogue quantity input and output interface, is configured to accept an analogue quantity signal of which a size or strength may continuously change, is an analogue quantity output interface configured to drive target equipment accepting the analogue quantity signal, and is a PWM analogue quantity output driving interface configured to output the analogue quantity in a PWM manner.

The network interface P7 may be a local area network interface, a wide area network interface, an Ethernet interface and an Internet interface.

The wireless interface P8 is a Bluetooth interface, a WI-FI interface, a ZigBee interface, a GPRS interface, a 2G mobile network interface, a 3G mobile network interface, a 4G mobile network interface, a 5G mobile network interface, a medium-wave communication interface, a short-wave communication interface, an ultrashort-wave communication interface, a microwave communication interface and the like.

It is important to note that synchronous recording and/or synchronous restoration of AV information and synchronous recording of non-AV information in the embodiment are synchronization within a certain error range, and the error range is determined according to a specific application requirement, and may be represented through a relative error or an absolute error.

According to the embodiment, the signal and/or second target file bearing the non-AV information forming the preset association relationship with the first target file including the AV information are/is received through the interface, and the signal is sent to the processing unit, and the processing unit configured to synchronously record and/or synchronously restore the AV information and the non-AV information is connected with the interface, and is configured to receive and/or send the signal. Non-audio and non-video stream information associated with an audio and video streaming media file is synchronously recorded according to synchronization information, so that the problem of undiversified synchronously recorded information during AV information recording is solved, and a technical effect of enriching synchronously recorded information during AV information recording is further achieved.

Embodiment 2

The embodiment of the disclosure provides a system for recording information.

Figure 3:
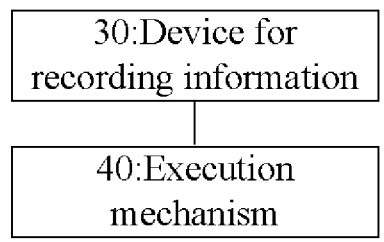
FIG. 3 is a schematic diagram of a system for recording information according to an embodiment of the disclosure.

FIG. 3 is a schematic diagram of a system for recording information according to an embodiment of the disclosure. As shown in FIG. 3, the system for recording information includes: a device for recording information 30 and an execution mechanism 40.

The device for recording information 30 includes the device for recording information in embodiment 1.

The execution mechanism 40 is connected with the device for recording information 30, and is configured to synchronously reproduce AV information and non-AV information.

Optionally, the execution mechanism may include at least one of: first execution equipment, configured to execute a first operation corresponding to force information configured to drive a mechanical motion in the non-AV information; second execution equipment, configured to execute a second operation corresponding to thermal information configured to indicate a temperature change in the non-AV information; third execution equipment, configured to execute a third operation corresponding to audio stream information in a first target file; fourth execution equipment, configured to execute a fourth operation corresponding to video stream information in the first target file; fifth execution equipment, configured to execute a fifth operation corresponding to a digital quantity signal in the non-AV information; and sixth execution equipment, configured to execute a sixth operation corresponding to an analogue quantity signal in the non-AV information.

The execution mechanism of the embodiment includes a hardware interface circuit and an execution mechanism. The first execution equipment may be a motor-driven equipment and an execution mechanism, the force information for driving the mechanical motion is reproduced by executing the first operation by the electrically-driven equipment through conversion from electrical energy to mechanical energy, and the first operation may be a force-driven operation, and may be configured to reproduce information about movement of a workpiece, movement of a welding gun, supply of a welding wire, mechanical deformation of a welding seam and the like.

The second execution equipment may be electrothermally-driven equipment and execution equipment, the thermal information configured to reflect the temperature change is reproduced by executing the second operation by an electrothermal converter such as heating equipment or cooling equipment, and the second operation may be a heating operation, and may be configured to reproduce information about strength of a welding current causing the temperature change of a weldment, how it changes, how about influence on the workpiece and the like.

The third execution equipment may be electro-acoustically-driven equipment and a loudspeaker, an audio signal is reproduced by executing the third operation through an electroacoustic converter, for example, the electroacoustic converter may be audio restoration equipment formed by an audio power amplifier, a horn, a sound box and the like, and the third operation may be an electro-acoustically driven operation, and may be configured to reproduce a sound of the mechanical motions audible for ears, a sound of the temperature change, a mechanical wave reflecting mechanical vibration and inaudible for the ears, and the like.

The fourth execution equipment may be light-emitting equipment or component such as a video display and an indicator lamp, a video signal may be reproduced through the video display, and an indicator lamp signal is reproduced by executing the fourth operation by the indicator lamp, wherein the video display may include video display equipment such as a television, and may be configured to reproduce information about light directly visible for eyes, movement or another geometric change between objects, a light wave directly invisible for the eyes and the like.

The fifth execution equipment and the sixth execution equipment may be signal output interface circuits, output interface driving circuits, power driving amplifiers, electrical apparatus equipment, electrical equipment, communication equipment and the like, a switch quantity is reproduced by executing the fifth operation by the fifth execution equipment such as a switch quantity driving interface and corresponding execution equipment, digital quantity combined information is sent to corresponding target equipment through a corresponding communication transmission interface, and an analogue quantity signal is reproduced by executing the sixth operation by the sixth execution equipment such as an analogue quantity output interface and corresponding execution equipment, for example, the welding current, response information of a process measurement and control instrument and apparatus and the like are reproduced.

The system for recording information of the embodiment includes the device for recording information, and the execution mechanism is connected with the device for recording information, and is configured to reproduce the AV information and the non-AV information. Non-audio and non-video stream information associated with an audio and video streaming media file is synchronously recorded and reproduced according to synchronization information, so that the problem of undiversified synchronously recorded information during AV information recording is solved, and a technical effect of enriching synchronously recorded information during AV information recording is further achieved. Therefore, real-time monitoring and post analysis, teaching demonstration, reality simulation, failure cause analysis and the like may be provided for production and scientific research processes.

Embodiment 3

The embodiment of the disclosure provides a method for recording information. It is important to note that the method for recording information of the embodiment may be executed by the device for recording information and system for recording information of the embodiments of the disclosure.

Figure 4:
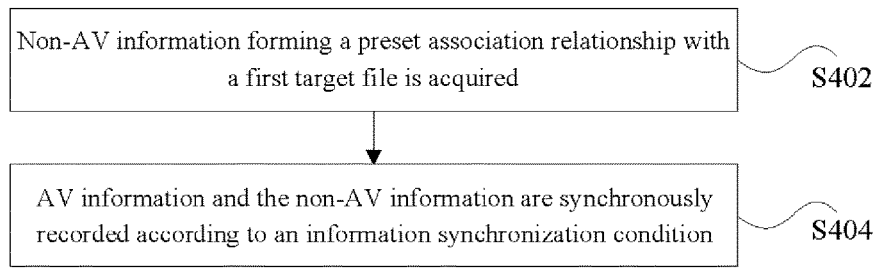
FIG. 4 is a flowchart of a method for recording information according to an embodiment of the disclosure.

FIG. 4 is a flowchart of a method for recording information according to an embodiment of the disclosure. As shown in FIG. 4, the method includes the following steps.

In Step S402, non-AV information forming a preset association relationship with a first target file is acquired.

In the technical solution provided by Step S402 of the disclosure, the non-AV information forming the preset association relationship with the first target file is acquired, wherein the first target file includes AV information and/or stream information formed by the AV information.

In the embodiment, the first target file may be transmitted in a transmission medium to form an information stream, and for example, is transmitted in the transmission medium to form an AV stream. The first target file may be an audio and video streaming media and a file recording streaming media information, and is configured to record the AV information, and the AV information is audio and video information. The non-AV information forming the preset association relationship with the first target file is acquired, the non-AV information is non-AV and non-video information, and the non-AV information may include force, thermal, sound, light, electrical, character, symbol and digital information and the like, which will not be limited herein. Optionally, the non-AV information may be recorded by a file, and for example, n (n=1, 2, . . . , 100,000, . . . ) files associated with the audio and video streaming media file and configured to record the non-AV information are created. The preset association relationship is a synchronous association relationship, and may be established through files with the same file name but different suffixes.

In Step S404, the AV information and the non-AV information are synchronously recorded according to an information synchronization condition.

In the technical solution provided by Step S404 of the disclosure, the AV information and the non-AV information are synchronously recorded according to the information synchronization condition.

After the AV information and the non-AV information are synchronously recorded according to the information synchronization condition, the AV information and the non-AV information are synchronously recorded according to the information synchronization condition, wherein the information synchronization condition is a condition for synchronously recording the AV information and the non-AV information. For example, the AV information and the non-AV information are synchronously recorded within a certain error range, and the AV information and the non-AV information are synchronously recorded according to synchronization information configured to synchronously record the AV information and the non-AV information. The AV information and the non-AV information may be recorded through a channel configured for information recording.

According to the embodiment, the non-AV information forming the preset association relationship with the first target file is acquired, wherein the first target file includes the AV information; and the AV information and the non-AV information are synchronously recorded according to the information synchronization condition. Since the non-audio and non-video stream information associated with the audio and video streaming media file is synchronously recorded according to the synchronization information, a purpose of synchronously recording the non-AV information during AV information recording is achieved, the problem of undiversified synchronously recorded information during AV information recording is solved, and a technical effect of enriching synchronously recorded information is achieved.

As an optional implementation mode, before the operation that the AV information and the non-AV information are synchronously recorded according to the information synchronization condition in Step S404, the method further includes that: synchronization information is acquired from a preset file or a preset synchronization information generator, wherein the synchronization information is used for synchronously recording the AV information and the non-AV information; and the operation that the AV information and the non-AV information are synchronously recorded according to the information synchronization condition in Step S404 includes that: the AV information and the non-AV information are synchronously recorded under the information synchronization condition according to the synchronization information.

The synchronization information is required by synchronous recording of the AV information and the non-AV information, and the synchronization information is used for synchronously recording the AV information and the non-AV information, and is adopted to ensure synchronous playing and decoding of the information. Optionally, a synchronization information source may be configured to provide the synchronization information, and is, for example, the preset file or the preset synchronization information generator. The synchronization information may be stored in the preset file or the preset synchronization information generator, and for example, may be exist in the first target file, and may also exist in another dedicated synchronization information file, and the preset synchronization information generator may be a synchronization information generated formed by software, or software or a software and hardware combination.

Optionally, the synchronization information is time synchronization information marked in a non-audio and non-video information recording file, playing speed information marked in the non-audio and non-video information recording file, default playing speed information of a non-audio and non-video information file and the like. The synchronization information may be a line, field and frame in a video, may exist in the AV information, and may also be other data capable of representing the time synchronization information, a default media playing speed, an expressed media playing speed and the like, which will not be limited herein.

According to the embodiment, before the AV information and the non-AV information are synchronously recorded according to the information synchronization condition, the synchronization information is acquired from the preset file or the preset synchronization information generator, and when the information synchronization condition is met, the AV information and the non-AV information are synchronously recorded according to the synchronization information. Therefore, the purpose of synchronously recording the non-AV information during AV information recording is achieved, and the technical effect of enriching the synchronously recorded information is achieved.

As an optional implementation mode, the operation that the non-AV information forming the preset association relationship with the first target file is acquired in Step S402 includes that: a second target file forming the preset association relationship with the first target file is acquired; and the non-AV information is acquired from the second target file.

The non-AV information of the embodiment may be recorded in the second target file forming the preset association relationship with the first target file, and there may be multiple second target files, for example, n (n=1, 2, . . . , 100,000) files associated with the audio and video streaming media file and configured to record the non-audio and non-video information. When the non-AV information forming the preset association relationship with the first target file is acquired, the second target file is acquired, the non-AV information is acquired from the second target file, and for example, force information, thermal information, sound information, light information, electrical information and the like recorded in the second target file are acquired.

Optionally, when the non-AV information is recorded in the first target file, a number of the second target files may be 0. For example, when driving test information is synchronously recorded, the driving test information may be included in the same file together with the AV information.

As an optional implementation mode, before the operation that the AV information and the non-AV information are synchronously recorded in Step S404, the method further includes that: synchronization information is acquired from the first target file or the second target file, or the synchronization information is extracted from AV information which is being recorded into the first target file, wherein the synchronization information is used for synchronously recording the AV information and the non-AV information; and the operation that the AV information and the non-AV information are synchronously recorded in Step S404 includes that: the AV information and the non-AV information are synchronously recorded according to the synchronization information.

In the embodiment, the first target file, the second target file and the AV information may all be determined as information sources configured to provide synchronization information, and providing time synchronization information for another series of files by a file is external synchronization. Before the AV information and the non-AV information are synchronously recorded, the synchronization information is acquired from the first target file or the second target file, or the synchronization information is extracted from the AV information which is being recorded into the first target file. When the information synchronization condition is met, the AV information and the non-AV information are synchronously recorded according to the synchronization information. Therefore, the purpose of synchronously recording the non-AV information during AV information recording is achieved, and the technical effect of enriching the synchronously recorded information is achieved.

As an optional implementation mode, the operation that the synchronization information is acquired from the second target file includes at least one of that: first time synchronization information is acquired from the second target file, and the first time synchronization information is determined as the synchronization information, wherein the first time synchronization information is configured to indicate synchronous recording of each piece of information forming the preset association relationship into a corresponding target file and recording of a synchronization information scale when each piece of information forming the preset association relationship is extracted, wherein the synchronization information scale is configured to mark the synchronization information; and first restoration speed information is acquired from the second target file, and the first restoration speed information is determined as the synchronization information, wherein the first restoration speed information is configured to indicate a first restoration speed for synchronous restoration of the second target file, and the first restoration speed may be a first playing speed.

In the embodiment, the second target file may be determined as a synchronization information source. The first time synchronization information may be acquired from the second target file, that is, the time synchronization information marked in the non-audio and non-video information recording file may be determined as the synchronization information configured to synchronously record the AV information and the non-AV information. The first time synchronization information is configured to indicate synchronous recording of each piece of information forming the preset association relationship into the corresponding target file. Since the information forming the preset association relationship is not in the same file, a synchronization error may be relatively big and undetermined when there is no synchronization time limit of the synchronization information, and for information on streaming media, it may not be ensured that the information forming the preset association relationship may be synchronously recorded. For example, field synchronization information and line synchronization information are required by a video stream propagated by a television station or a video file recorded on another digital carrier, none is dispensable, and an image may not be kept synchronized in the absence of any kind of synchronization. Therefore, the streaming media and the recording file should have the synchronization information scales, and the first time synchronization information is further configured to indicate recording of the synchronization scale when each piece of information forming the preset association relationship is extracted. The synchronization information scale is configured to mark the synchronization information, and is namely another expression about marking of the synchronization information. Such a synchronization information marking method does not require marking of the synchronization information scales in the whole recording file and/or information stream, and only requires marking at the beginning of the file and/or the beginning of the stream information. When a default playing speed is used, such a synchronization information marking method is required to appear in the recording file or the information stream.

The first restoration speed information may further be acquired from the second target file, and the first restoration speed information is determined as the synchronization information, that is, the playing speed information in the file configured to record the non-audio and non-video information may also be determined as the synchronization information configured to synchronously record the AV information and the non-AV information, wherein the first restoration speed information is configured to indicate the first restoration speed for synchronous restoration of the second target file. For example, a Moving Picture Experts Group Audio Layer-4 (MP4) file is played according to recorded playing speed information when being played by a player, and the playing speed information in the MP4 file is not recorded in each MP4 file, but is recorded in a standard file except the MP4 file.

As an optional implementation mode, the operation that the synchronization information is extracted from the AV information which is being recorded into the first target file includes that: second time synchronization information is extracted from the AV information which is being recorded into the first target file, and the second time synchronization information is determined as the synchronization information, wherein the second time synchronization information is configured to indicate a condition for restoring the information forming the preset association relationship in each target file.

The second target file of the embodiment is configured to record the non-AV information, the synchronization information configured to synchronously record the AV information and the non-AV information may be sourced from the first target file, and at this moment, the first target file is an external synchronization information file, and the synchronization information acquired therefrom is external synchronization information. When the synchronization information is extracted from the AV information which is being recorded into the first target file, the second time synchronization information may be extracted from the first target file, the second time synchronization information may be extracted from an audio and video information file associated with the n non-audio and non-video information recording files, and the second time synchronization information may be configured to indicate the condition for restoring the information forming the preset association relationship in each target file, and may be a line, field and frame in the video, or the other data capable of representing the time synchronization information, or the default media playing speed, or the expressed media playing speed or the like.

As an optional implementation mode, the operation that the non-AV information forming the preset association relationship with the first target file is acquired in Step S402 includes that: the non-AV information is extracted from the first target file.

In the embodiment, the non-AV information may be stored in the first target file, that is, the non-AV information may be stored in the same file together with the AV information. When the non-AV information forming the preset association relationship with the first target file is acquired, the non-AV information is extracted from the first target file, that is, the non-audio and non-video information is synchronously extracted from the audio and video streaming media file.

As an optional implementation mode, the operation that the non-AV information is extracted from the first target file includes that: the non-AV information is extracted from the first target file through a preset player, wherein the preset player is configured to play the first target file.

When the non-audio and non-video information is synchronously extracted from the first target file, the preset player configured to play the first target file may be adopted for completion, and the time synchronization information required by extraction of the non-audio and non-video information may also be provided by the preset player. The preset player is a dedicated player, that is, synchronous extraction of the non-audio and non-video information from the audio and video streaming media file is completed by the dedicated player for playing the audio and video streaming media file, and the time synchronization information required by extraction of the non-audio and non-video information is also provided by the dedicated player for playing the audio and video streaming media file. The synchronization information configured to synchronously record the AV information and the non-AV information may be sourced from the first target file, so that the synchronization information is provided by the same file, and internal synchronization for information recording is further implemented.

As an optional implementation mode, before the operation that the AV information and the non-AV information are synchronously recorded, the method further includes that: synchronization information provided by the preset player is acquired, wherein the synchronization information is used for synchronously recording the AV information and the non-AV information when the target file is played; and the operation that the AV information and the non-AV information are synchronously recorded includes that: the AV information and the non-AV information are synchronously recorded according to the synchronization information.

In the embodiment, the synchronization information configured to synchronously record the AV information and the non-AV information may be provided by the preset player, that is, the synchronization information required by extraction of the non-audio and non-video information is provided by the dedicated player configured to play the audio and video streaming media file. The synchronization information is used for synchronously recording the AV information and the non-AV information when the target file is played, i.e. AV information and non-AV information required to be recorded and restored. Regardless of a number of target files where they exist respectively, synchronization is performed according to the synchronization information of the embodiment during synchronization.

As an optional implementation mode, the operation that the AV information and the non-AV information are synchronously recorded according to the synchronization information in Step S404 includes that: at least one first information channel is created in the first target file, wherein the first target file includes a first preset information channel and a second preset information channel, the first preset information channel is configured to represent a position of video information in the AV information in the first target file, and the second preset information channel is configured to represent a position of audio information in the AV information in the first target file; and according to the synchronization information, the video information is synchronously recorded into the first preset information channel, the audio information is synchronously recorded into the second preset information channel, and the non-AV information extracted from the first target file is recorded into the at least one first information channel in the target file.

When the AV information and the non-AV information are synchronously recorded according to the synchronization information, the at least one first information channel is created in the first target file. For example, m (m=1, 2, ..., 1000,000, ...) kinds of dedicated channels S1, S2, ..., Sm, ... configured to record non-audio and non-video information are additionally developed according to a practical requirement. The first target file includes the first preset information channel and the second preset information channel, the first preset information channel is configured to represent the position of the video information in the AV information in the first target file, and may be a video channel, and the second preset information channel is configured to represent the position of the audio information in the AV information in the first target file, and may be an audio channel. After the synchronization information is acquired, according to the synchronization information, the video information is synchronously recorded into the first preset information channel, the audio information is synchronously recorded into the second preset information channel, and the non-AV information extracted from the first target file is recorded into the at least one first information channel in the target file. It is important to note that this solution may be adopted under a normal circumstance of synchronously recording AV information and non-AV information.

Optionally, a multimedia file has only two kinds of channels, i.e. an audio channel and a video channel respectively, at this moment, m=2, there are three channels, one channel is configured to record video information, and the other two channels are configured to left and right sound track information of a dual-track stereo. If the audio channel is configured to record a Dolby surround sound, and at this moment, there are 6 sound recording channels. However, it is usually considered that such an audio and video file only has audio and video channels.

As an optional implementation mode, the operation that the AV information and the non-AV information are synchronously recorded according to the synchronization information includes that: according to the synchronization information, video information of the first target file is synchronously recorded into first preset information channel, audio information of the first target file is synchronously recorded into a first sound track in preset double sound tracks, and the non-AV information extracted from the first target file is synchronously recorded into a second sound track in the preset double sound tracks, wherein the first preset information channel is configured to represent a position of the video information in the AV information in the first target file, the first sound track is configured to represent a position of the audio information in the AV information in the first target file, and the second sound track is configured to represent a position of the non-AV information in the first target file.

In the embodiment, the preset double sound tracks may be dual-track audio information channels, and the preset double sound tracks include the first sound track and the second sound track. When the information synchronization condition is met, the video information of the first target file is synchronously recorded into the first preset information channel according to the synchronization information, so that the position of the video information in the AV information in the first target file may be determined; the audio information in the first target file is synchronously recorded into the first sound track, so that the position of the audio information in the AV information in the first target file maybe determined; and the non-AV information extracted from the first target file is synchronously recorded into the second sound track, so that the position of the non-AV information in the first target file may be determined. Resources are saved.

As an optional implementation mode, after the operation that the AV information and the non-AV information are synchronously recorded, the method further includes that: the synchronously recorded AV information and non-AV information are embedded into a third target file.

After the AV information and the non-AV information are synchronously recorded, the synchronously recorded AV information and non-AV information may be embedded into the third target file, that is, data blocks marked with non-audio and non-video information may be embedded into some existing common audio and video streams and/or media files, and the audio and video streams and/or the media files may be files configured to record holographic data or streaming media files including the holographic data. Optionally, under the circumstance that it is necessary to store a multi-channel video signal source of not only one channel, streaming media information including the holographic data exists outside the first target file, and the third target file may be a file configured to record the holographic data. Optionally, the streaming media information including the holographic data is not required to exist outside the first target file, the holographic data does not only exist in the third target file, and may also be stored in any target file according to a practical requirement.

As an optional implementation mode, after the operation that the AV information and the non-AV information are synchronously recorded, the method further includes that: the synchronously recorded AV information and non-AV information are embedded into a video code stream, wherein the AV information and the non-AV information are additional information of the video code stream.

After the AV information and the non-AV information are synchronously recorded, the synchronously recorded AV information and non-AV information may be embedded into the video code stream, the AV information and the non-AV information are the additional information of the video code stream, and the additional information is additional information of a nonindividual frame in AV frames. Optionally, the AV information and the non-AV information are semantic characteristic information of a moving target, and the semantic characteristic information of the moving target is written into a position where corresponding video information in a monitoring video frame exists in the video code stream as non-video information of the video code stream (which is called as "noise" information in the field of information processing and the field of signal detection).

For example, for an image with "piece" as a unit, non-AV information is embedded into the image, and becomes a noise of the image. In an interlaced scanning video system, for example, a PAL television system (not a high-definition television but an ordinary television) of China, a frame of image is divided into two pieces for transmission and display, so that a frame frequency of the television is 25 HZ/S, and a field frequency (i.e. amplitude frequency) is 50 HZ/S. Under the circumstance that there is a small amount of non-video information (i.e. video noise) in information of a piece of image, eyes cannot feel any obvious change in quality of the video image, and this is a theoretical basis for embedding non-AV information into AV information, and is also an application of an information encryption method.

In the embodiment, the non-AV information becomes information in an audio and video stream after being embedded into the AV information, and is in an audio and video frame. This method has a relatively high encryption capability, and may embed textual words or some codes into an audio stream or file, a video stream or file and a piece of image.

As an optional implementation mode, the operation that the non-AV information forming the preset association relationship with the first target file is acquired includes that: under the circumstance that the non-AV information and the first target file correspond to one or a set of control instructions, it is determined that that non-AV information and the first target file form the preset association relationship, and the non-AV information is acquired; and/or under the circumstance that a file name of a file where the non-AV information is located is the same as a file name of the first target file, it is determined that the non-AV information and the first target file form the preset association relationship, and the non-AV information is acquired.

In the embodiment, when the non-AV information forming the preset association relationship with the first target file is acquired, under the circumstance that the non-AV information and the first target file correspond to one or a set of control instructions, that is, under the circumstance that the first target file and the non-AV information are generated under control of the same or set of control instructions, it is determined that the non-AV information and the first target file form the preset association relationship, that is, the association relationship is established between the non-AV information and the first target file, and the non-AV information is acquired; and/or under the circumstance that the file name of the file where the non-AV information is located is the same as the file name of the first target file, it is determined that the non-AV information and the first target file form the preset association relationship, that is, the association relationship is established between the non-AV information and the first target file, and the non-AV information is acquired.

As an optional implementation mode, the operation that the non-AV information forming the preset association relationship with the first target file is acquired includes that: the non-AV information forming the preset association relationship with the first target file is synchronously acquired from an information stream.

In the embodiment, the target file is configured to record information changing along with time, and is namely a carrier configured to record stream information. Original stream information recorded in the file is turned into static information. However, the solution disclosed by the embodiment further include that multiple types information forming the preset association relationship may be synchronously extracted from the stream information, wherein two mutually inverse processes of marking, i.e. coding, and restoration, i.e. decoding, are included. When the non-AV information forming the preset association relationship with the first target file is acquired, the non-AV information forming the preset association relationship with the first target file is synchronously acquired from the information stream.

As an optional implementation mode, the operation that the non-AV information forming the preset association relationship with AV stream information is acquired includes that: the non-AV information forming the preset association relationship with certain channel information in the information stream is synchronously acquired from the information stream.

Optionally, text information forming a synchronization relationship with a video of the video channel in the video stream is acquired. For example, marks are deduced when a vehicle body of a test vehicle in a driving test process contacts with a line at a certain moment. When dedicated software is adopted for lookup, not only may a video image at the moment when the vehicle body contacts with the line be known, but also a specific part, contacting with the line, of the vehicle body at that moment and the exactly deduced marks may be displayed in human-computer interface software.

As an optional implementation mode, the first target file includes: expressed AV information and default AV information, wherein the expressed AV information is information set according to a preset instruction and required to be recorded synchronously with the non-AV information, and the default AV information is default information required to be recorded synchronously with the non-AV information.

In the embodiment, the first target file includes: the expressed AV information and the default AV information, wherein the expressed AV information may be manually set information, there is no default value if there is no standard specification, and it must be definitely recorded in the file. The default AV information is also hidden information, that is, the first target file includes the expressed AV information or the hidden AV information and information configured to synchronize the AV information and the non-AV information. For example, existing streaming media or its storage file hides that "audio information (both single-channel and dual-track stereo information)" therein is "synchronized with video information", which is not required to be expressed because one or some certain standards are followed, that is, conventional standards are followed.

It is important to note that, in the embodiment, both external synchronization and internal synchronization are mentioned in terms of time, and have no influence on contents in the file, that is, attributes and numerical values of the information therein may not be changed. When there is a relatively high requirement made on a relative error of time, a line synchronization signal or field synchronization signal on a video information stream is adopted for time synchronization (which is called as internal synchronization because the synchronization information comes from the same file at this moment). An attribute of information in a multimedia file is unrelated to a synchronization source, an original audio and video streaming media file includes audio and video information, further includes non-audio and non-video information, and for example, further includes one or more kinds of information in force information, thermal information, sound information, light information, electrical information, character information and a digital code, and if the file is not damaged, in copying, playing and propagation processes, the audio and video streaming media file includes the audio and video information, and further includes the non-audio and non-video information, and the information is still the original information. Difference values of time of sequential appearance of various kinds of information forming the preset association relationship during reproduction and difference values of time of appearance on the spot are small enough to meet a requirement.

It is important to note that the steps shown in the flowchart of the drawing may be executed in a computer system, for example, a group of computers, capable of executing instructions, and moreover, although a logic sequence is shown in the flowchart, the shown or described steps may be executed in a sequence different from the sequence shown here under some circumstances.

Embodiment 4

The technical solutions of the disclosure will be described below in combination with a preferred embodiment.

In the embodiment, providing time synchronization information for another series of files by a file is a solution of external synchronization for information recording. n (n=1, 2, . . . , 100,000) files associated with an audio and video streaming media file and configured to record non-audio and non-video information are created, and synchronization information configured to synchronously record the n files configured to record the non-audio and non-video information may include at least one of: time synchronization information marked in the non-audio and non-video information recording files, playing speed information marked in the non-audio and non-video information recording files, and default playing speed information of a non-audio and non-video information file.

A player may extract the time synchronization information from the audio and video information file associated with the n non-audio and non-video information recording files at the same time of playing, and determine the time synchronization information as synchronization information configured to synchronously record AV information and non-AV information. Such synchronization information is a line, field and frame in a video, or other data capable of representing the time synchronization information, or a default media playing speed, or an expressed media playing speed.

In the embodiment, providing the time synchronization information by the same file is a solution of internal synchronization for information recording. In an audio and video streaming media file with only two kinds of channels, i.e. an audio information channel and a video information channel, m (m=1, 2, . . . , 1000,000) kinds of dedicated channels S1, S2, . . . , Sm configured to record non-audio and non-video information are additionally developed according to a practical requirement.

Figure 5:
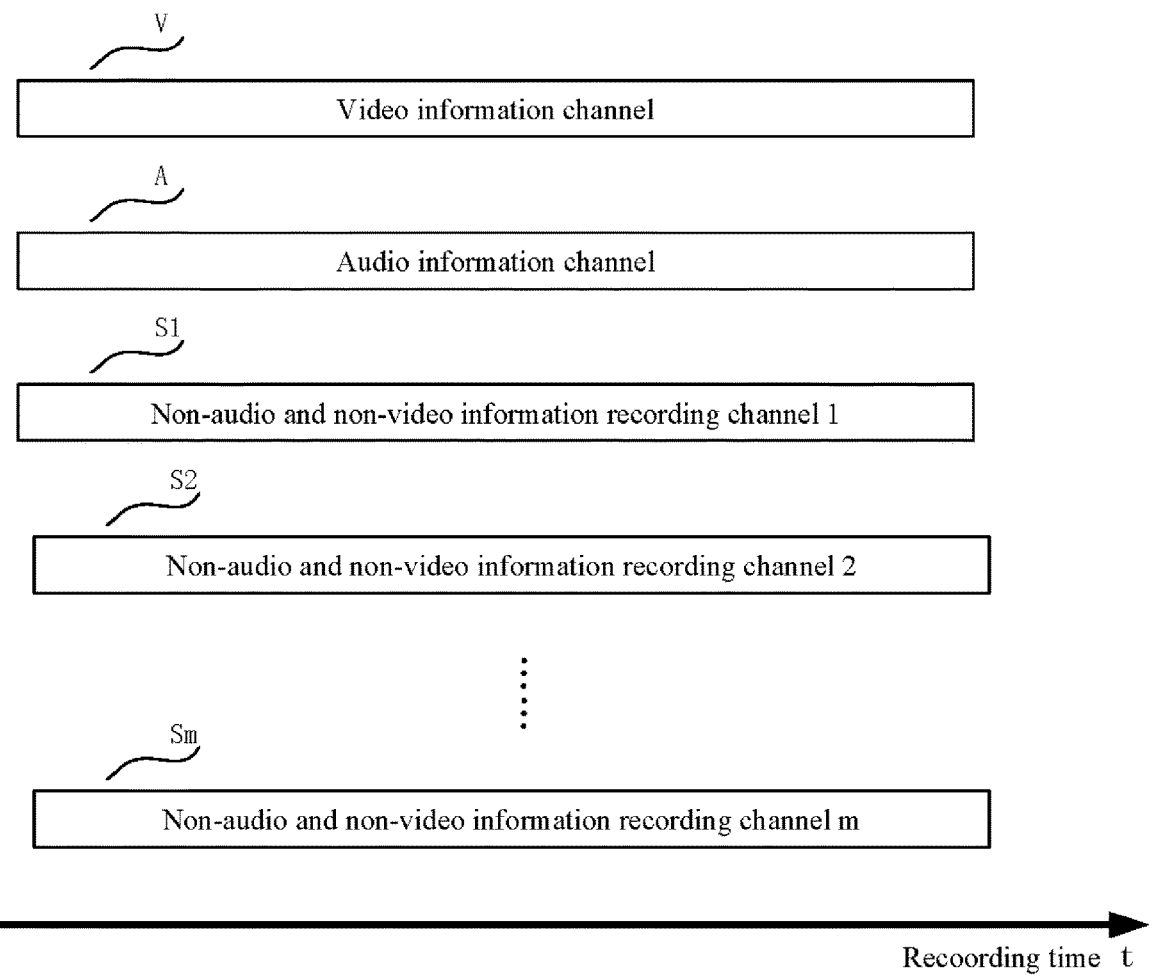
FIG. 5 is a schematic diagram of multiple dedicated channels for recording non-audio and non-video information in the same file according to an embodiment of the disclosure.

FIG. 5 is a schematic diagram of multiple dedicated channels for recording non-audio and non-video information in the same file according to an embodiment of the disclosure. As shown in FIG. 5, in an audio and video media file only with a video information channel V and an audio information channel A, a channel S1, a channel S2, . . . and a channel Sm are additionally developed according to a requirement, wherein S1 is a non-audio and non-video information recording channel 1, S2 is a non-audio and non-video information recording channel 2, . . . , and Sm is a non-audio and non-video information recording channel m. This solution may be adopted under a normal circumstance of synchronously recording AV information and non-AV information, and the information is synchronously recorded along with a recording time t.

Synchronous extraction of the non-audio and non-video information from the audio and video streaming media file may be completed through a dedicated player for playing the audio and video streaming media file, and the time synchronization information required by extracting the non-audio and non-video information may also be provided by the dedicated player for playing the audio and video streaming media file.

Figure 6:
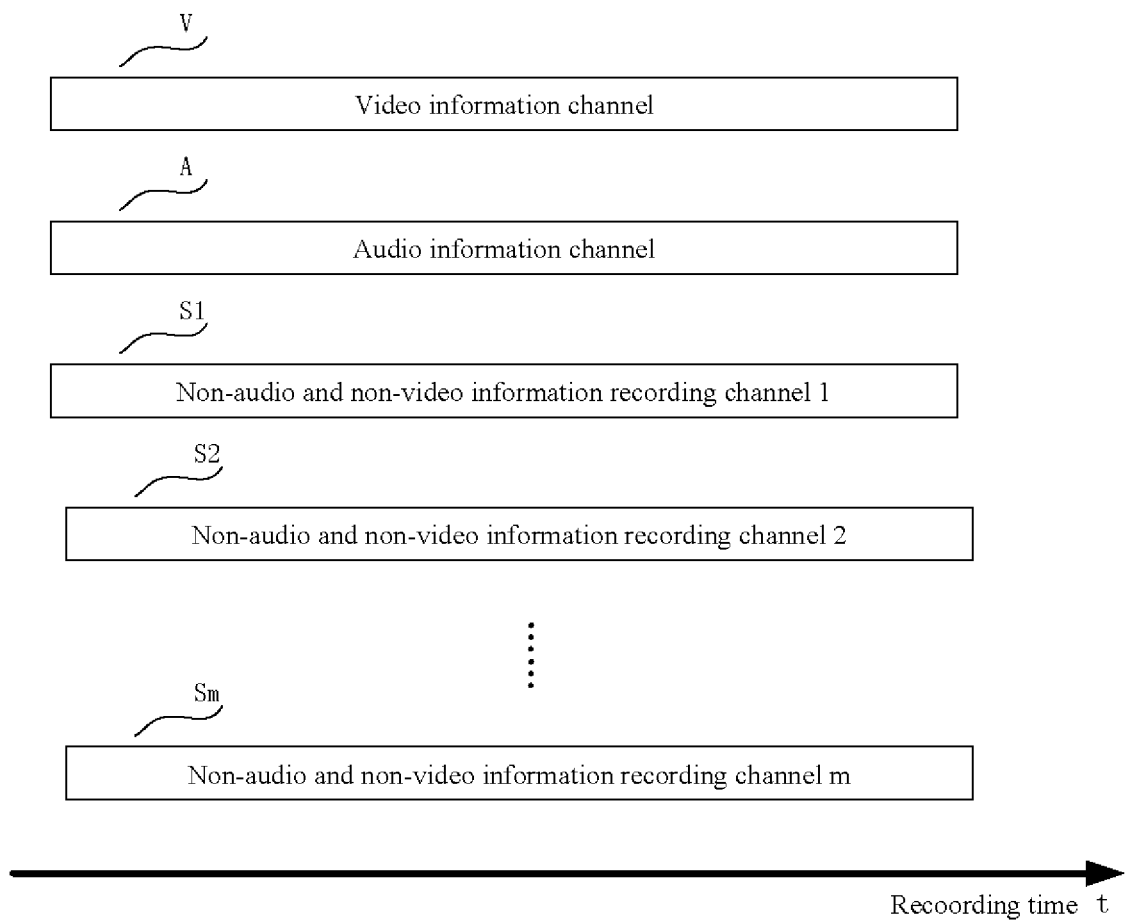
FIG. 6 is a schematic diagram of recording non-audio and non-video information with one channel of a dual-channel stereo according to an embodiment of the disclosure.

FIG. 6 is a schematic diagram of recording non-audio and non-video information with one channel of a dual-channel stereo according to an embodiment of the disclosure. As shown in FIG. 6, a sound track S in a conventional dual-track audio information channel is utilized as a dedicated channel for recording the non-audio and non-video information. According to the synchronization information, video information in the AV information is synchronously recorded into the channel V, audio information in the AV information is synchronously recorded into a sound track A in the dual-track audio information channel, and the information is synchronously recorded along with the recording time t.

According to the embodiment, synchronous extraction of the non-audio and non-video information from the audio and video streaming media file is completed by the dedicated player for playing the audio and video streaming media file, and the time synchronization information required by extracting the non-audio and non-video information is also provided by the dedicated player for playing the audio and video streaming media file.

According to this example, data blocks marked with non-audio and non-video information may be embedded into some existing common audio and video streams and/or media files, difference values of time of sequential appearance of various kinds of information forming a preset association relationship during reproduction and difference values of time of appearance on the spot are small enough to meet a requirement, and the AV information and the non-AV information may be synchronously recorded in terms of time, so that a purpose of synchronously recording the non-AV information during AV information recording is achieved, and a technical effect of enriching synchronously recorded information is achieved.

Embodiment 5

The embodiment of the disclosure further provides a device for recording information. It is important to note that the device for recording information of the embodiment may be configured to execute the method for recording information of the embodiment of the disclosure.

Figure 7:
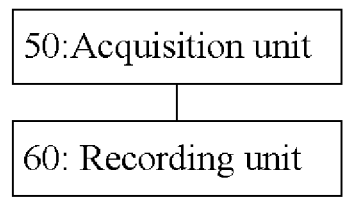
FIG. 7 is a schematic diagram of another device for recording information according to an embodiment of the disclosure.

FIG. 7 is a schematic diagram of another device for recording information according to an embodiment of the disclosure. As shown in FIG. 7, the device includes: an acquisition unit 50 and a recording unit 60.

The acquisition unit 50 is configured to acquire non-AV information forming a preset association relationship with a first target file, wherein the first target file includes AV information and/or stream information formed by the AV information.

The recording unit 60 is configured to synchronously record the AV information and the non-AV information according to an information synchronization condition.

Optionally, the device further includes: a first acquisition unit, configured to, before the AV information and the non-AV information are synchronously recorded according to the information synchronization condition, acquire synchronization information from a preset file or a preset synchronization information generator, wherein the synchronization information is used for synchronously recording the AV information and the non-AV information; and the recording unit 60 includes: a first recording module, configured to synchronously record the AV information and the non-AV information under the information synchronization condition according to the synchronization information.

Optionally, the acquisition unit 50 includes: a first acquisition module and a second acquisition module, wherein the first acquisition module is configured to acquire a second target file forming the preset association relationship with the first target file; and the second acquisition module is configured to acquire the non-AV information from the second target file.

Optionally, the device further includes: a second acquisition unit, configured to, before the AV information and the non-AV information are synchronously recorded, acquire synchronization information from the first target file or the second target file, or extract the synchronization information from AV information which is being recorded into the first target file, wherein the synchronization information is used for synchronously recording the AV information and the non-AV information; and the recording unit 60 includes: a second recording module, configured to synchronously record the AV information and the non-AV information according to the synchronization information.

Optionally, that the second acquisition unit is configured to acquire the synchronization information from the second target file includes one of that: first time synchronization information is acquired from the second target file, and the first time synchronization information is determined as the synchronization information, wherein the first time synchronization information is configured to indicate synchronous recording of each piece of information forming the preset association relationship into a corresponding target file and recording of a synchronization information scale when each piece of information forming the preset association relationship is extracted, wherein the synchronization information scale is configured to mark the synchronization information; and first restoration speed information is acquired from the second target file, and the first restoration speed information is determined as the synchronization information, wherein the first restoration speed information is configured to indicate a first restoration speed for synchronous restoration of the second target file.

Optionally, the second acquisition unit includes: a first extraction module, configured to extract second time synchronization information from the AV information which is being recorded into the first target file, and determine the second time synchronization information as the synchronization information, wherein the second time synchronization information is configured to indicate a condition for restoring the information forming the preset association relationship in each target file.

Optionally, the acquisition unit 50 includes: a second extraction module, configured to extract the non-AV information from the first target file.

Optionally, the second extraction module includes: an extraction sub-module, configured to extract the non-AV information from the first target file through a preset player, wherein the preset player is configured to play the first target file.

Optionally, the device further includes: a third acquisition unit, configured to, before the AV information and the non-AV information are synchronously recorded, acquire synchronization information provided by the preset player, wherein the synchronization information is used for synchronously recording the AV information and the non-AV information when the target file is played; and the recording unit 60 includes: a second recording module, configured to synchronously record the AV information and the non-AV information according to the synchronization information.

Optionally, the second recording module includes: a creation sub-module and a first recording sub-module, wherein the creation sub-module is configured to create at least one first information channel in the first target file, wherein the first target file includes a first preset information channel and a second preset information channel, the first preset information channel is configured to represent a position of video information in the AV information in the first target file, and the second preset information channel is configured to represent a position of audio information in the AV information in the first target file; and the first recording sub-module is configured to, according to the synchronization information, synchronously record the video information into the first preset information channel, synchronously record the audio information into the second preset information channel, and record the non-AV information extracted from the first target file into the at least one first information channel in the target file.

Optionally, the second recording module includes: a second recording sub-module, configured to according to the synchronization information, synchronously record video information of the first target file into first preset information channel, synchronously record audio information of the first target file into a first sound track in preset double sound tracks, and synchronously record the non-AV information extracted from the first target file into a second sound track in the preset double sound tracks, wherein the first preset information channel is configured to represent a position of the video information in the AV information in the first target file, the first sound track is configured to represent a position of the audio information in the AV information in the first target file, and the second sound track is configured to represent a position of the non-AV information in the first target file.

Optionally, the device further includes: a first embedding unit, configured to, after the AV information and the non-AV information are synchronously recorded, embed the synchronously recorded AV information and non-AV information into a third target file.

Optionally, the device further includes: a second embedding unit, configured to, after the AV information and the non-AV information are synchronously recorded, embed the synchronously recorded AV information and non-AV information into a video code stream, wherein the AV information and the non-AV information is additional information of the video code stream and/or part of the video code stream.

Optionally, the acquisition unit 50 includes: a first determination module, configured to, under the circumstance that the non-AV information and the first target file correspond to one or a set of control instructions, determine that that non-AV information and the first target file form the preset association relationship, and acquire the non-AV information; and/or a second determination module, configured to, under the circumstance that a file name of a file where the non-AV information is located is the same as a file name of the first target file, determine that the non-AV information and the first target file form the preset association relationship, and acquire the non-AV information.

Optionally, the acquisition unit 50 includes: a third acquisition module, configured to synchronously acquire the non-AV information forming the preset association relationship with the first target file from an information stream.

Optionally, the first target file includes: expressed AV information and default AV information, wherein the expressed AV information is information set according to a preset instruction and required to be recorded synchronously with the non-AV information, and the default AV information is default information required to be recorded synchronously with the non-AV information.

According to the embodiment, the non-AV information forming the preset association relationship with the first target file is acquired through the acquisition unit 50, wherein the first target file includes the AV information, and the AV information and the non-AV information are synchronously recorded through the recording unit 60 according to the information synchronization condition. Non-audio and non-video stream information associated with an audio and video streaming media file is synchronously recorded according to the synchronization information, the problem of undiversified synchronously recorded information during AV information recording is solved, and a technical effect of enriching synchronously recorded information during AV information recording is further achieved.

Embodiment 6

The embodiment of the disclosure further provides a storage medium. The storage medium includes a stored program, wherein the program is run to control equipment where the storage medium is located to execute the method for recording information of the embodiment of the disclosure.

Embodiment 7

The embodiment of the disclosure further provides a processor. The processor is configured to run a program, wherein the program is run to execute the method for recording information of the embodiment of the disclosure or restore recorded information.

Obviously, those skilled in the art should know that each module or each step of the disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, or may form each integrated circuit module respectively, or multiple modules or steps therein may form a single integrated circuit module for implementation. As a consequence, the disclosure is not limited to any specific hardware and software combination.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

What is claimed is:

1. A method for recording information, comprising:
    acquiring by a processor, non-Audio/Video (AV) information forming a preset association relationship with a first target file, wherein the first target file comprises AV information; and
    synchronously recording by the processor, the AV information and the non-AV information according to an information synchronization condition,
    wherein the preset association relationship is a synchronous association relationship, and is established through files with the same file name but different suffixes, and the AV information is audio information and video information, the non-AV information is non-AV information and non-video information, the non-AV information is acquired through a first interface which is connected with the processing unit.

2. The method as claimed in claim 1, wherein
    before synchronously recording by the processor, the AV information and the non-AV information according to the information synchronization condition, further comprising: acquiring by the processor, synchronization information from a preset file or a preset synchronization information generator, wherein the synchronization information is used for synchronously recording the AV information and the non-AV information, wherein
    synchronously recording by the processor, the AV information and the non-AV information according to the information synchronization condition comprises: synchronously recording by the processor, the AV information and the non-AV information under the information synchronization condition according to the synchronization information.

3. The method as claimed in claim 2, wherein acquiring by the processor, the non-AV information forming the preset association relationship with the first target file comprises:
under the circumstance that the non-AV information and the first target file correspond to one or a set of control instructions, determining by the processor, that that non-AV information and the first target file form the preset association relationship, and acquiring by the processor, the non-AV information; and/or
under the circumstance that a file name of a file where the non-AV information is located is the same as a file name of the first target file, determining by the processor, that the non-AV information and the first target file form the preset association relationship, and acquiring by the processor, the non-AV information.

4. The method as claimed in claim 2, wherein the first target file comprises:
expressed AV information and default AV information, wherein the expressed AV information is information set according to a preset instruction and required to be recorded synchronously with the non-AV information, and the default AV information is default information required to be recorded synchronously with the non-AV information.

5. The method as claimed in claim 1, wherein acquiring by the processor, the non-AV information forming the preset association relationship with the first target file comprises:
acquiring by the processor, a second target file forming the preset association relationship with the first target file; and
acquiring by the processor, the non-AV information from the second target file.

6. The method as claimed in claim 5, wherein
before synchronously recording by the processor, the AV information and the non-AV information, further comprising: acquiring by the processor, synchronization information from the first target file or the second target file, or extracting by the processor, the synchronization information from AV information which is being recorded into the first target file, wherein the synchronization information is used for synchronously recording the AV information and the non-AV information, wherein
synchronously recording by the processor, the AV information and the non-AV information comprises: synchronously recording the AV information and the non-AV information according to the synchronization information.

7. The method as claimed in claim 6, wherein acquiring by the processor, the synchronization information from the second target file comprises at least one of:
acquiring by the processor, first time synchronization information from the second target file, and determining by the processor the first time synchronization information as the synchronization information, wherein the first time synchronization information is configured to indicate synchronous recording of each piece of information forming the preset association relationship into a corresponding target file and recording of a synchronization information scale when each piece of information forming the preset association relationship is extracted, wherein the synchronization information scale is configured to mark the synchronization information; and acquiring by the processor, first restoration speed information from the second target file, and determining by the processor, the first restoration speed information as the synchronization information, wherein the first restoration speed information is configured to indicate a first restoration speed for synchronous restoration of the second target file.

8. The method as claimed in claim 6, wherein extracting by the processor, the synchronization information from the AV information which is being recorded into the first target file comprises:
extracting by the processor, second time synchronization information from the AV information which is being recorded into the first target file, and determining by the processor, the second time synchronization information as the synchronization information, wherein the second time synchronization information is configured to indicate a condition for restoring the information forming the preset association relationship in each target file.

9. The method as claimed in claim 1, wherein acquiring by the processor, the non-AV information forming the preset association relationship with the first target file comprises:
extracting by the processor, the non-AV information from the first target file.

10. The method as claimed in claim 9, wherein extracting by the processor, the non-AV information from the first target file comprises:
extracting by the processor, the non-AV information from the first target file through a preset player, wherein the preset player is configured to play the first target file.

11. The method as claimed in claim 10, wherein
before synchronously recording by the processor, the AV information and the non-AV information, further comprising: acquiring by the processor, synchronization information provided by the preset player, wherein the synchronization information is used for synchronously recording the AV information and the non-AV information in a case that the target file is played, wherein
synchronously recording by the processor, the AV information and the non-AV information comprises: synchronously recording by the processor, the AV information and the non-AV information according to the synchronization information.

12. The method as claimed in claim 11, wherein synchronously recording by the processor, the AV information and the non-AV information according to the synchronization information comprises:
creating by the processor, at least one first information channel in the first target file, wherein the first target file comprises a first preset information channel and a second preset information channel, the first preset information channel is configured to represent a position of video information in the AV information in the first target file, and the second preset information channel is configured to represent a position of audio information in the AV information in the first target file; and
according to the synchronization information, synchronously recording by the processor, the video information into the first preset information channel, synchronously recording by the processor, the audio information into the second preset information channel, and recording by the processor, the non-AV information extracted from the first target file into the at least one first information channel in the target file.

13. The method as claimed in claim 11, wherein synchronously recording by the processor, the AV information and the non-AV information according to the synchronization information comprises:
    according to the synchronization information, synchronously recording by the processor, video information of the first target file into first preset information channel, synchronously recording by the processor, audio information of the first target file into a first sound track in preset double sound tracks, and synchronously recording by the processor, the non-AV information extracted from the first target file into a second sound track in the preset double sound tracks, wherein the first preset information channel is configured to represent a position of the video information in the AV information in the first target file, the first sound track is configured to represent a position of the audio information in the AV information in the first target file, and the second sound track is configured to represent a position of the non-AV information in the first target file.

14. The method as claimed in claim 1, after synchronously recording by the processor, the AV information and the non-AV information, further comprising:
    embedding by the processor, the synchronously recorded AV information and non-AV information into a third target file.

15. The method as claimed in claim 1, after synchronously recording by the processor, the AV information and the non-AV information, further comprising:
    embedding by the processor, the synchronously recorded AV information and non-AV information into a video code stream, wherein the AV information and the non-AV information are additional information of the video code stream.

16. The method as claimed in claim 1, wherein acquiring by the processor, the non-AV information forming the preset association relationship with the first target file comprises:
    under the circumstance that the non-AV information and the first target file correspond to one or a set of control instructions, determining by the processor, that that non-AV information and the first target file form the preset association relationship, and acquiring by the processor, the non-AV information; and/or
    under the circumstance that a file name of a file where the non-AV information is located is the same as a file name of the first target file, determining by the processor, that the non-AV information and the first target file form the preset association relationship, and acquiring by the processor, the non-AV information.

17. The method as claimed in claim 1, wherein acquiring by the processor, the non-AV information forming the preset association relationship with the first target file comprises:
    synchronously acquiring by the processor, the non-AV information forming the preset association relationship with the first target file from an information stream.

18. The method as claimed in claim 1, wherein the first target file comprises:
    expressed AV information and default AV information, wherein the expressed AV information is information set according to a preset instruction and required to be recorded synchronously with the non-AV information, and the default AV information is default information required to be recorded synchronously with the non-AV information.

19. A device for recording information, comprising:
    a first interface, configured to receive a signal and/or second target file bearing non-Audio/Video (AV) information forming a preset association relationship with a first target file comprising AV information, and send the signal to a processing unit; and
    the processing unit configured to synchronously record and/or synchronously restore the AV information and the non-AV information, connected with the first interface and configured to receive and/or send the signal,
    wherein the preset association relationship is a synchronous association relationship, and is established through files with the same file name but different suffixes, and the AV information is audio information and video information, the non-AV information is non-AV information and non-video information.

20. A system for recording information, comprising:
    the device for recording information as claimed in claim 19; and
    an execution mechanism, connected with the device for recording information and configured to synchronously reproduce Audio/Video (AV) information and non-AV information.

\* \* \* \* \*